(12) United States Patent
Gao

(10) Patent No.: US 11,863,105 B2
(45) Date of Patent: Jan. 2, 2024

(54) METHOD AND CONTROL SYSTEM FOR CONTROLLING AN ELECTRIC MOTOR

(71) Applicant: ABB Schweiz AG, Baden (CH)

(72) Inventor: Yang Gao, Västerås (SE)

(73) Assignee: ABB Schweiz AG, Baden (CH)

( * ) Notice: Subject to any disclaimer, the term of this patent is extended or adjusted under 35 U.S.C. 154(b) by 529 days.

(21) Appl. No.: 17/261,475

(22) PCT Filed: Jul. 25, 2018

(86) PCT No.: PCT/EP2018/070155
§ 371 (c)(1),
(2) Date: Jan. 19, 2021

(87) PCT Pub. No.: WO2020/020451
PCT Pub. Date: Jan. 30, 2020

(65) Prior Publication Data
US 2021/0328527 A1  Oct. 21, 2021

(51) Int. Cl.
*H02P 5/74* (2006.01)
*B25J 9/12* (2006.01)
*B25J 9/16* (2006.01)

(52) U.S. Cl.
CPC ............ *H02P 5/74* (2013.01); *B25J 9/12* (2013.01); *B25J 9/1664* (2013.01)

(58) Field of Classification Search
CPC . B25J 9/0003; B25J 9/12; B25J 9/1664; B25J 9/0096; B65H 67/065; G01N 35/0099; H02P 27/085; H02P 23/0027; H02P 27/08; H02P 27/00; H02P 27/04; H02P 27/06; H02P 1/54; H02P 1/24; H02P 1/26; H02P 1/46; H02P 1/56; H02P 1/58; H02P 6/04; H02P 6/08; H02P 7/29; H02P 23/28; H02P 23/07; H02P 23/14; H02P 21/18; H02P 25/03; H02P 2207/05; B29C 37/0007; B25B 9/00; B62D 57/032
See application file for complete search history.

(56) References Cited

U.S. PATENT DOCUMENTS

2008/0187298 A1  8/2008  Holden et al.
2010/0250067 A1  9/2010  Matsumura et al.
(Continued)

FOREIGN PATENT DOCUMENTS

CN  102384118 A  3/2012
WO  2007005318 A2  1/2007

OTHER PUBLICATIONS

International Preliminary Report on Patentability; Application No. PCT/EP2018/070155; dated Nov. 9, 2020; 17 Pages.
(Continued)

*Primary Examiner* — Antony M Paul
(74) *Attorney, Agent, or Firm* — Whitmyer IP Group LLC

(57) ABSTRACT

A method for controlling an electric motor, the method including determining a planned reference speed of the electric motor; determining a pulse-width modulation (PWM) switching frequency based on the planned reference speed; and controlling the electric motor with an alternating current produced by PWM switching with the determined PWM switching frequency. A control system for controlling an electric motor and an industrial robot including a control system, are also provided.

16 Claims, 1 Drawing Sheet

(56) References Cited

U.S. PATENT DOCUMENTS

| | | | |
|---|---|---|---|
| 2013/0119902 A1* | 5/2013 | Gries | H02M 5/4585 |
| | | | 318/400.3 |
| 2014/0265975 A1 | 9/2014 | Holmes et al. | |
| 2014/0361721 A1 | 12/2014 | Yamaguchi | |
| 2015/0333675 A1 | 11/2015 | Barbosa et al. | |

OTHER PUBLICATIONS

International Search Report & Written Opinion of the International Searching Authority: Application No. PCT/EP2018/070155; Completed: Mar. 13, 2019; dated Mar. 25, 2019; 12 Pages.

European Office Action; Application No. 18745923.5; Completed: Nov. 23, 2022; 7 Pages.

\* cited by examiner

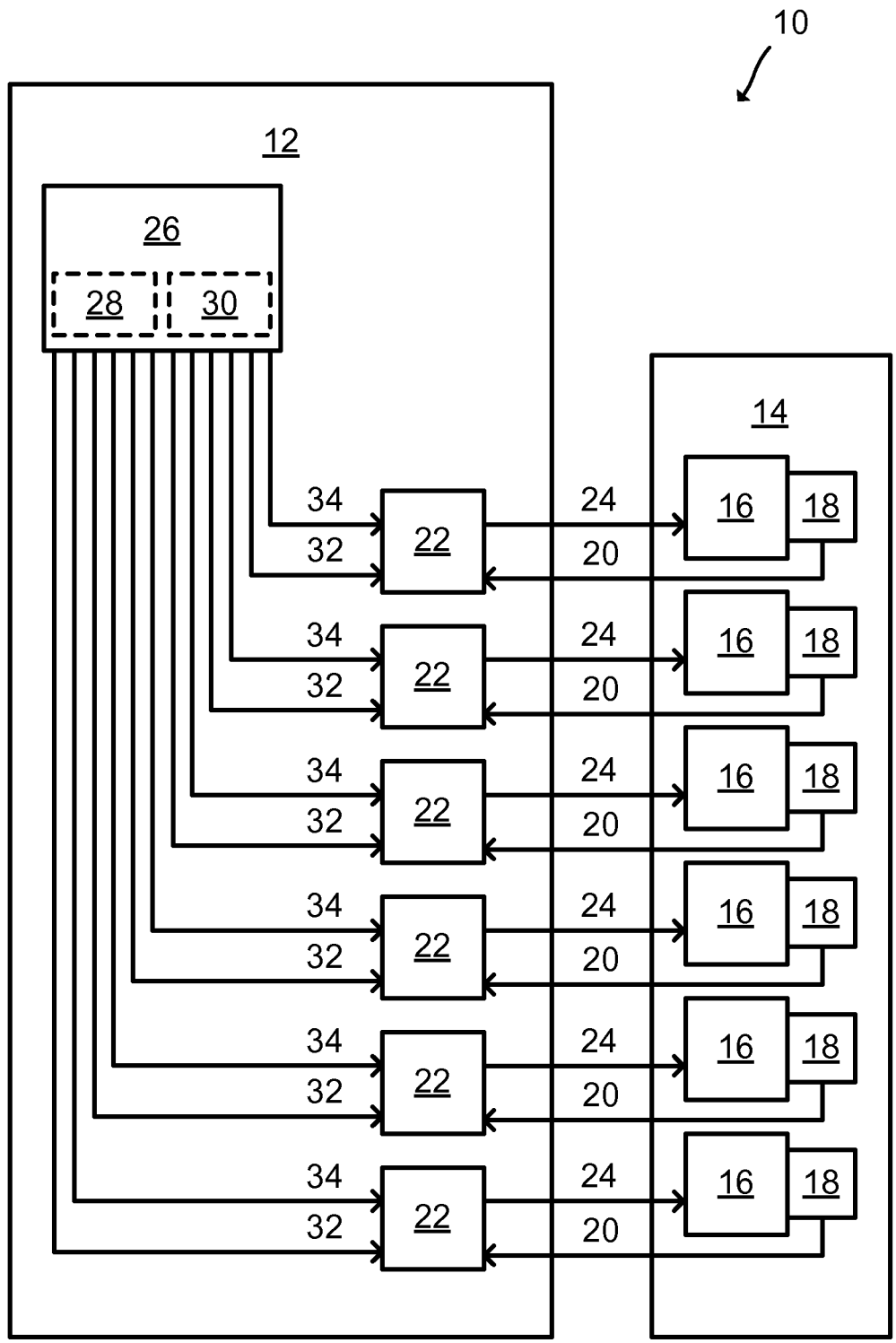

METHOD AND CONTROL SYSTEM FOR CONTROLLING AN ELECTRIC MOTOR

TECHNICAL FIELD

The present disclosure generally relates to a method and a control system for controlling an electric motor. In particular, a method for controlling an electric motor where a pulse-width modulation (PWM) switching frequency is determined based on a planned reference speed of the electric motor, a control system for controlling an electric motor, and an industrial robot comprising a control system, are provided.

BACKGROUND

PWM controlled electric motors with a large number of poles require high PWM switching frequencies. Today, such electric motors are controlled with a constantly high PWM switching frequency. With a constantly high PWM switching frequency, the electric motor may be overheated. High PWM switching frequencies also lead to switching losses, electromagnetic compatibility (EMC) problems and higher costs. In some drive unit applications, an increase of PWM switching frequency of 50% to 150% leads to a switching loss increase of 50% to 150%, much higher EMC problems and a cost increase of over 50%. However, the higher PWM switching frequency is only needed at higher speeds of the electric motors.

CN 102384118 A discloses an electro-hydraulic proportional valve speed regulation control method, a device, a system and engineering mechanical equipment. The method comprises the following steps: obtaining actual speed of a hydraulic actuator element; regulating frequency and/or duty ratio of PWM signals exerted on the electro-hydraulic proportional valve according to the difference value when the difference between the actual speed and the expected speed is larger than a predetermined value; calculating frequency and/or amplitude of flutter signals according to the regulated frequency and/or duty ratio of the PWM signals, and regulating the calculated amplitude of the flutter signals; and inputting the regulated flutter signals and the regulated PWM signals together to the electro-hydraulic proportional valve.

US20140265975A1 discloses a method of controlling a power inverter coupled to an electric motor in a vehicle powertrain. The switching frequency of the power inverter is at least partially based on at least one operating parameter of the vehicle, such as the speed of the electric motor.

WO200705318A2 discloses controlling torque of an electric motor by controlling a switching frequency of a respective power inverter.

US20140361721A1 discloses control of electric motors in an industrial robot. The temperatures of respective power inverters are estimated to avoid overheating of the same, and the relationship between the switching frequency and electric power losses is recognized.

SUMMARY

One object of the present disclosure is to provide a method for controlling an electric motor, which method improves the performance of the electric motor.

A further object of the present disclosure is to provide a method for controlling an electric motor, which method provides a robust and/or smooth control of the electric motor.

A further object of the present disclosure is to provide a method for controlling an electric motor, which method extends the lifetime of the electric motor and/or of a drive unit for the electric motor.

A still further object of the present disclosure is to provide a method for controlling an electric motor, which method reduces costs associated with the electric motor.

A still further object of the present disclosure is to provide a method for controlling an electric motor, which method reduces EMC problems associated with the electric motor.

A still further object of the present disclosure is to provide a method for controlling an electric motor, which method solves several or all of the foregoing objects.

A still further object of the present disclosure is to provide a control system for controlling an electric motor, which control system solves one, several or all of the foregoing objects.

A still further object of the present disclosure is to provide an industrial robot comprising a control system for controlling an electric motor, which industrial robot solves one, several or all of the foregoing objects.

According to one aspect, there is provided a method for controlling an electric motor, the method comprising determining a planned reference speed of the electric motor; determining a PWM switching frequency based on the planned reference speed; and controlling the electric motor with an alternating current produced by PWM switching with the determined PWM switching frequency.

The method constitutes a dynamic PWM switching frequency control method. By determining the PWM switching frequency based on the planned reference speed, no feedback from the electric motor for determining the PWM switching frequency is needed. The determination of the PWM switching frequency based on a planned reference speed, and not based on feedback from the electric motor, is advantageous for several reasons. For example, the method thereby provides for a more robust control and the control of the electric motor is not lost. Furthermore, disturbances in feedback signals, such as measurement errors, from the electric motor can be avoided in the determination of the PWM switching frequency.

The method is based on the principle that the planned reference speed, i.e. a prediction of the reference speed of the electric motor, is good enough for determining a suitable PWM switching frequency. Feedback from the electric motor may however be used for servo control of the electric motor and/or for monitoring the performance of the electric motor. For example, feedback from a position sensor may be used to calculate the present speed of the electric motor for various purposes.

When the electric motor is driven in the planned reference speed, a PWM switching frequency corresponding to the planned reference speed is used. Throughout the present disclosure, the planned reference speed of the electric motor may be constituted by a planned reference rotational speed. Furthermore, throughout the present disclosure, the electric motor may be constituted by an electric servomotor.

The determination of the PWM switching frequency may comprise determining a higher PWM switching frequency if the planned reference speed is relatively high, or determining a lower PWM switching frequency if the planned reference speed is relatively low. By setting a higher PWM switching frequency at relatively high speeds and setting a lower PWM switching frequency at relatively low speeds, problems associated with constantly or lasting high PWM switching frequencies can be avoided while still supporting the use of high power density electric motors which require high PWM switching frequencies at high speeds, e.g. electric motors having at least 16 poles.

The method further enables full use of a power cycling margin of a drive unit. That is, the method enables a drive of the electric motor at high speeds with high PWM switching frequencies without the drive unit becoming the bottleneck in terms of lifetime.

The determination of the PWM switching frequency may comprise setting a predetermined high PWM switching frequency when the planned reference speed is above a high speed threshold value. The predetermined high PWM switching frequency may for example be 6 to 14 kHz, such as 8 to 10 kHz. The high speed threshold value may for example be 4000 to 8000 rpm, such as 6000 rpm.

The determination of the PWM switching frequency may comprise setting a predetermined low PWM switching frequency when the planned reference speed is below a low speed threshold value. The predetermined low PWM switching frequency may for example be 1 to 3 kHz, such as 1.5 to 2.5 kHz, such as 2 kHz. The low speed threshold value may for example be 200 to 800 rpm, such as 250 rpm.

The determination of the PWM switching frequency may further comprise setting a PWM switching frequency that is proportional to the planned reference speed when the planned reference speed is above the low speed threshold value. The PWM switching frequency may for example be proportional to the planned reference speed when the planned reference speed is between the low speed threshold value and the high speed threshold value.

The determination of the PWM switching frequency may comprise predicting a load on the electric motor based on the planned reference speed; and determining the PWM switching frequency based on the load on the electric motor. In this case, the prediction of the load on the electric motor may be made based on a mathematical model of the electric motor.

The method may further comprise adjusting one or more control parameters of a drive unit for outputting the alternating current, based on the planned reference speed. The control parameters of the electric motor will thereby also follow the planned reference speed of the electric motor. By adapting the control parameters to the planned reference speed of the electric motor, a stable and consistent control of the electric motor can be ensured over the entire range of speeds of the electric motor. This solution provides a smooth control of the electric motor since it can be avoided that changes in the PWM switching frequency influences the control performance of the electric motor negatively. This smooth control is particularly useful for industrial robots where a manipulator may carry out many jerky movements, in contrast to for example an electric car. This solution further improves robustness of the control of the electric motor.

For example, in PI (proportional-integral) control of current to the electric motor, a high $K_p$ (proportional coefficient) and a low $K_v$ (integral coefficient) of a control function may be set during relatively high speeds of the electric motor, and a high $K_v$ but low $K_p$ may be set during relatively low speeds of the electric motor, depending on the control purpose of the application of the electric motor. Various types of non-linear control methods may be used in the drive unit to adjust $K_p$ and $K_v$ according to the PWM switching frequency for outputting an alternating current having a desired electric frequency.

The method may comprise determining a planned reference speed of a plurality of electric motors of an industrial robot; for each of the electric motors, determining a PWM switching frequency based on the planned reference speed of the electric motor; and controlling each of the electric motors with an alternating current produced by PWM switching with the determined PWM switching frequency. This method constitutes a dynamic PWM switching frequency control method which considers the dynamic behavior of the industrial robot.

The step of determining a planned reference speed for each electric motor may be made by a path planner of the industrial robot. The method according to the present disclosure may however be implemented in applications other than industrial robots. For example, the method may be implemented for controlling an electric motor of a conveyor belt, or other industrial actuator.

According to a further aspect, there is provided a method for controlling an electric motor, the method comprising determining a PWM switching frequency for an electric motor; controlling the electric motor with an alternating current produced by PWM switching with the determined PWM switching frequency; and adjusting one or more control parameters of a drive unit for outputting the alternating current, based on the PWM switching frequency.

According to a further aspect, there is provided a control system for controlling an electric motor, the control system comprising a data processing device and a memory having a computer program stored thereon, the computer program comprising program code which, when executed by the data processing device, causes the data processing device to perform the steps of determining a planned reference speed of the electric motor; determining a pulse-width modulation (PWM) switching frequency based on the planned reference speed of the electric motor; and controlling a drive unit to output an alternating current to the electric motor, the alternating current being produced by PWM with the determined PWM switching frequency. The control system may further be configured to carry out any method according to the present disclosure.

The control system may comprise at least one drive unit for producing an alternating current having a desired electric frequency with a PWM technique. The control system may for example comprise one drive unit associated with each electric motor or one drive unit associated with a plurality of electric motors.

Each drive unit may for example comprise an inverter that is electrically interposed between a direct current (DC) power supply and the electric motor, and converts electric power between a direct current and an alternating current (AC); a smoothing capacitor that is electrically interposed between the DC power supply and the inverter, and is connected between a positive pole and a negative pole on a DC side of the inverter; and an inverter control unit that controls switching of a switching element of the inverter according to a predefined switching frequency.

According to a further aspect, there is provided a control system for controlling an electric motor, the control system comprising a data processing device and a memory having a computer program stored thereon, the computer program comprising program code which, when executed by the data processing device, causes the data processing device to perform the steps of determining a PWM switching frequency; controlling the electric motor with an alternating current produced by PWM switching with the determined PWM switching frequency; and adjusting one or more control parameters of a drive unit for outputting the alternating current, based on the PWM switching frequency.

According to a further aspect, there is provided an industrial robot comprising a control system according to the present disclosure and a manipulator having at least one electric motor, such as a plurality of electric motors. Each electric motor may comprise at least six poles, such as at least ten poles, such as at least 16 poles.

The control system may comprise a path planner configured to determine the planned reference speed of the electric motor.

BRIEF DESCRIPTION OF THE DRAWINGS

Further details, advantages and aspects of the present disclosure will become apparent from the following embodiments taken in conjunction with the drawings, wherein:

FIG. 1: schematically represents a block diagram of an industrial robot comprising a control system and a manipulator having a plurality of electric motors.

DETAILED DESCRIPTION

In the following, a method for controlling an electric motor where a pulse-width modulation (PWM) switching frequency is determined based on a planned reference speed of the electric motor, a control system for controlling an electric motor, and an industrial robot comprising a control system, will be described. The same reference numerals will be used to denote the same or similar structural features.

FIG. 1 schematically represents a block diagram of one example of an industrial robot 10 comprising a control system 12 and a manipulator 14 having a plurality of electric motors 16. The industrial robot 10 according to FIG. 1 constitutes one of many possible implementations of a method for controlling an electric motor 16 according to the present disclosure.

In FIG. 1, the electric motors 16 of the manipulator 14 are used to control movements (e.g. rotational or translational) of a plurality of links (not shown) relative to each other. Each electric motor 16 is arranged to drive a joint (not shown) between two adjacent links. In the non-limiting example in FIG. 1, each electric motor 16 is constituted by a rotary electric servomotor having 16 poles. The manipulator 14 is illustrated as comprising six electric motors 16, but the number of electric motors 16 may be increased or reduced.

The manipulator 14 further comprises a plurality of position sensors 18, e.g. resolvers, associated with the electric motors 16. Each position sensor 18 is arranged for real-time detection of the rotational position of an associated electric motor 16. Signals representing the measured position 20 of each electric motor 16 are sent to the control system 12. Optionally, the manipulator 14 further comprises one or more speed detection sensors (not shown) for real-time detection of the rotational speed of each electric motor 16.

The control system 12 comprises a plurality of drive units 22. Each drive unit 22 is configured to produce an alternating current 24 with a certain electric frequency produced by PWM technique. In the example in FIG. 1, the control system 12 comprises one drive unit 22 associated with each electric motor 16. One drive unit 22 may however alternatively drive a plurality of electric motors 16.

Each drive unit 22 may comprise a rectifier for converting AC into DC, a frequency inverter, and a DC bus connected between the rectifier and the inverter. The inverter converts the DC current to a variable alternating current 24. Each drive unit 22 may further comprise an inverter control unit that controls switching of one or more switching elements of the inverter according to a commanded switching frequency.

The variable alternating current 24 from the inverter of the drive unit 22 is supplied to an associated electric motor 16.

The inverter of the drive unit 22 may further comprise an IGBT (insulated-gate bipolar transistor) module. The IGBT module has a lifetime depending on the power cycling. If high PWM switching frequencies are used also at lower speeds of the associated electric motor 16, the lifetime of the IGBT module is reduced.

The control system 12 of this example further comprises a main computer 26. The main computer 26 comprises a data processing device 28 (e.g. a central processing unit, CPU) and a memory 30. A computer program is stored in the memory 30. A manipulator program, a model of the manipulator 14 and a path planner is implemented in the main computer 26, e.g. in the memory 30. The path planner plans the path of the manipulator 14. For each electric motor 16 of the manipulator 14, the path planner generates a signal representing planned reference speed 32 based on movement instructions from the manipulator program and the model of the manipulator 14. The control system 12 is thereby configured to determine a planned reference speed 32 of the electric motor 16.

The path planner may further generate a signal representing a reference position 34 based on movement instructions from the manipulator program and the model of the manipulator 14 for each electric motor 16. The planned reference speed 32, and optionally the reference position 34 for each electric motor 16, are sent to the associated drive unit 22.

The planned reference speed 32 for each electric motor 16 and the measured position 20 for each electric motor 16 are used by the associated drive unit 22 for close loop PID control of the electric motor 16. The control parameters of the PID control ($K_p$, $K_i$, $K_d$) may be regulated with a function of the planned reference speed 32 and the PWM switching frequency.

The alternating current 24 may for example be generated by means of SVPWM (Space Vector PWM) and current loop PI control, implemented in each drive unit 22. The control parameters of the PI control ($K_p$, $K_i$) may be regulated with a function of the planned reference speed 32 and the PWM switching frequency.

The control system 12 is further configured to determine a PWM switching frequency based on the planned reference speed 32 of the associated electric motor 16. A high switching frequency may be set when the planned reference speed 32 is high and a low switching frequency may be set when the planned reference speed 32 is low. The alternating current 24, produced by PWM switching with the determined PWM switching frequency, is output to the electric motor 16 when driving the electric motor 16 at the planned reference speed 32.

The PWM switching frequency may be set to a predetermined low value (e.g. 2 kHz) when the planned reference speed 32 is below a low speed threshold value (e.g. 250 rpm). The PWM switching frequency may be set to a predetermined high value (e.g., 10 kHz) when the planned reference speed 32 is above a high speed threshold value (e.g. 6000 rpm). The PWM switching frequency may be set to an intermediate value (between the predetermined low value and the predetermined high value) proportional to the planned reference speed 32 when the planned reference speed 32 is between the low speed threshold value and the high speed threshold value.

While the present disclosure has been described with reference to exemplary embodiments, it will be appreciated that the present invention is not limited to what has been described above. For example, it will be appreciated that the dimensions of the parts may be varied as needed.

The invention claimed is:

1. A method for controlling electric motors, the method comprising:
   determining a planned reference speed of a plurality of electric motors of an industrial robot; wherein
   for each of the electric motors, determining a pulse-width modulation (PWM) switching frequency based on the planned reference speed of the electric motor; and
   controlling each of the electric motors with an alternating current produced by PWM switching with the determined PWM switching frequency.

2. The method according to claim 1, wherein the determination of the PWM switching frequency comprises determining a higher PWM switching frequency if the planned reference speed is relatively high, or determining a lower PWM switching frequency if the planned reference speed is relatively low.

3. The method according to claim 2, wherein the determination of the PWM switching frequency comprises setting a predetermined high PWM switching frequency when the planned reference speed is above a high speed threshold value.

4. The method according to claim 2, wherein the determination of the PWM switching frequency comprises setting a predetermined low PWM switching frequency when the planned reference speed is below a low speed threshold value.

5. The method according to claim 2, wherein the determination of the PWM switching frequency comprises:
   predicting a load on the electric motor based on the planned reference speed; and
   determining the PWM switching frequency based on the load on the electric motor.

6. The method according to claim 1, wherein the determination of the PWM switching frequency comprises setting a predetermined high PWM switching frequency when the planned reference speed is above a high speed threshold value.

7. The method according to claim 1, wherein the determination of the PWM switching frequency comprises setting a predetermined low PWM switching frequency when the planned reference speed is below a low speed threshold value.

8. The method according to claim 7, wherein the determination of the PWM switching frequency comprises setting a PWM switching frequency that is proportional to the planned reference speed when the planned reference speed is above the low speed threshold value.

9. The method according to claim 1, wherein the determination of the PWM switching frequency comprises:
   predicting a load on the electric motor based on the planned reference speed; and
   determining the PWM switching frequency based on the load on the electric motor.

10. The method according to claim 9, wherein the prediction of the load on the electric motor is made based on a mathematical model of the electric motor.

11. The method according to claim 1, further comprising adjusting one or more control parameters of a drive unit for outputting the alternating current, based on the planned reference speed.

12. A control system for controlling electric motors, the control system comprising a data processing device and a memory having a computer program stored thereon, the computer program comprising program code which, when executed by the data processing device, causes the data processing device to perform the step of determining a planned reference speed of a plurality of electric motors of an industrial robot; wherein the computer program further comprises program code which, when executed by the data processing device, causes the data processing device to perform the steps of:
   for each of the electric motors, determining a PWM switching frequency based on the planned reference speed of the electric motor; and
   controlling each of the electric motors with an alternating current produced by PWM switching with the determined PWM switching frequency.

13. An industrial robot comprising a control system according to claim 12 and a manipulator having at least one electric motor.

14. The industrial robot according to claim 13, wherein the electric motor comprises at least six poles.

15. The industrial robot according to claim 14, wherein the control system comprises a path planner configured to determine the planned reference speed of the electric motor.

16. The industrial robot according to claim 13, wherein the control system comprises a path planner configured to determine the planned reference speed of the electric motor.

* * * * *